US011824685B2

(12) United States Patent
Xue et al.

(10) Patent No.: US 11,824,685 B2
(45) Date of Patent: Nov. 21, 2023

(54) METHOD FOR IMPLEMENTING GRE TUNNEL, ACCESS POINT AND GATEWAY

(71) Applicant: HUAWEI TECHNOLOGIES CO., LTD., Guangdong (CN)

(72) Inventors: Li Xue, Shenzhen (CN); Shanshan Wang, Shanghai (CN); Zongpeng Du, Shenzhen (CN); Zhiwang Zhao, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/867,662

(22) Filed: Jul. 18, 2022

(65) Prior Publication Data

US 2022/0368563 A1 Nov. 17, 2022

Related U.S. Application Data

(63) Continuation of application No. 17/083,287, filed on Oct. 28, 2020, now abandoned, which is a continuation of application No. 14/991,497, filed on Jan. 8, 2016, now Pat. No. 10,855,491, which is a continuation of application No. PCT/CN2013/079168, filed on Jul. 10, 2013.

(51) Int. Cl.
*H04L 12/46* (2006.01)
*H04L 65/1033* (2022.01)

(52) U.S. Cl.
CPC ...... *H04L 12/4633* (2013.01); *H04L 65/1036* (2013.01)

(58) Field of Classification Search
None
See application file for complete search history.

(56) References Cited

U.S. PATENT DOCUMENTS

| 6,754,221 | B1 | 6/2004 | Whitcher et al. |
| 6,982,984 | B1 | 1/2006 | Asayesh et al. |
| 7,136,384 | B1 | 11/2006 | Wang |
| 7,356,031 | B1 | 4/2008 | Toebes et al. |
| 7,797,426 | B1 | 9/2010 | Lyon |
| 7,830,787 | B1 | 11/2010 | Wijnands et al. |
| 8,184,644 | B1 | 5/2012 | Chen et al. |

(Continued)

FOREIGN PATENT DOCUMENTS

| CN | 1398090 A | 2/2003 |
| CN | 101119272 A | 2/2008 |

(Continued)

OTHER PUBLICATIONS

CISCO. Implementing Tunnels. 2007(Year: 2007), total 66 pages.

(Continued)

*Primary Examiner* — The Hy Nguyen
(74) *Attorney, Agent, or Firm* — James Anderson Harrison

(57) ABSTRACT

A method for implementing a generic routing encapsulation (GRE) tunnel, an access point (AP), and a network system. The method includes establishing a Control And Provisioning of Wireless Access Points (CAPWAP) tunnel with an access controller (AC), receiving addresses of at least two gateways, establishing at least two GRE tunnels coupled to the gateways respectively according to the addresses of the at least two gateways, and selecting one of the at least two GRE tunnels to transmit data.

16 Claims, 9 Drawing Sheets

(56) References Cited

U.S. PATENT DOCUMENTS

| | | |
|---|---|---|
| 8,279,752 B1 | 10/2012 | Busch et al. |
| 8,595,846 B1 | 11/2013 | Etheredge et al. |
| 8,976,649 B2 | 3/2015 | Li et al. |
| 9,313,687 B2 | 4/2016 | Knutson |
| 9,344,421 B1 | 5/2016 | Chen et al. |
| 9,350,706 B1 | 5/2016 | Smith et al. |
| 9,450,817 B1 | 9/2016 | Bahadur et al. |
| 2003/0158967 A1 | 8/2003 | Tripathi et al. |
| 2004/0013118 A1 | 1/2004 | Borella |
| 2004/0066769 A1 | 4/2004 | Ahmavaara et al. |
| 2004/0085951 A1 | 5/2004 | Rezaiifar et al. |
| 2004/0223497 A1 | 11/2004 | Sanderson et al. |
| 2005/0080884 A1 | 4/2005 | Siorpaes et al. |
| 2005/0089008 A1 | 4/2005 | Choo et al. |
| 2005/0220069 A1 | 10/2005 | Li et al. |
| 2005/0270992 A1 | 12/2005 | Sanzgiri et al. |
| 2006/0015590 A1 | 1/2006 | Patil et al. |
| 2006/0143702 A1 | 6/2006 | Hisada et al. |
| 2006/0198345 A1 | 9/2006 | Chen |
| 2006/0200543 A1 | 9/2006 | Kong et al. |
| 2006/0245408 A1 | 11/2006 | Lee et al. |
| 2006/0251101 A1 | 11/2006 | Zhang et al. |
| 2007/0081469 A1 | 4/2007 | Tracy et al. |
| 2007/0147372 A1 | 6/2007 | Liu et al. |
| 2007/0254661 A1 | 11/2007 | Chowdhury et al. |
| 2007/0276905 A1 | 11/2007 | Durand et al. |
| 2007/0283429 A1 | 12/2007 | Chen et al. |
| 2008/0144627 A1 | 6/2008 | Ballantyne et al. |
| 2008/0281978 A1 | 11/2008 | Tang et al. |
| 2009/0003208 A1 | 1/2009 | Payyappilly et al. |
| 2009/0003313 A1 | 1/2009 | Busch et al. |
| 2009/0046577 A1 | 2/2009 | Marin |
| 2009/0073935 A1 | 3/2009 | Xia et al. |
| 2009/0303973 A1 | 12/2009 | Patil |
| 2009/0310551 A1 | 12/2009 | Hellgren et al. |
| 2010/0067462 A1 | 3/2010 | Beser et al. |
| 2010/0142410 A1 | 6/2010 | Huynh Van et al. |
| 2010/0238791 A1 | 9/2010 | Duncan et al. |
| 2010/0238805 A1 | 9/2010 | Ludwig et al. |
| 2010/0246829 A1 | 9/2010 | McGrew et al. |
| 2010/0302989 A1 | 12/2010 | Sung et al. |
| 2011/0004913 A1 | 1/2011 | Nagarajan et al. |
| 2011/0038380 A1 | 2/2011 | Li et al. |
| 2011/0044690 A1 | 2/2011 | Al-Kadi et al. |
| 2011/0069701 A1 | 3/2011 | Wu |
| 2011/0110328 A1 | 5/2011 | Pradeep et al. |
| 2011/0122824 A1 | 5/2011 | Muhanna et al. |
| 2011/0131645 A1 | 6/2011 | Johnson et al. |
| 2011/0274108 A1 | 11/2011 | Fan |
| 2011/0286396 A1 | 11/2011 | Kato et al. |
| 2012/0033663 A1 | 2/2012 | Guichard et al. |
| 2012/0063450 A1 | 3/2012 | Pignataro et al. |
| 2012/0099561 A1 | 4/2012 | Zhao et al. |
| 2012/0099602 A1 | 4/2012 | Nagapudi et al. |
| 2012/0208504 A1* | 8/2012 | Song ..................... H04W 12/06 455/411 |
| 2012/0281708 A1 | 11/2012 | Chauhan et al. |
| 2012/0294277 A1 | 11/2012 | Jaiswal et al. |
| 2013/0044636 A1 | 2/2013 | Koponen et al. |
| 2013/0054761 A1 | 2/2013 | Kempf et al. |
| 2013/0155849 A1 | 6/2013 | Koodli et al. |
| 2013/0155965 A1* | 6/2013 | Koodli ................. H04W 4/021 370/329 |
| 2013/0250951 A1 | 9/2013 | Koganti |
| 2013/0254264 A1 | 9/2013 | Hankinson et al. |
| 2013/0315125 A1 | 11/2013 | Ravishankar et al. |
| 2014/0010234 A1 | 1/2014 | Patel et al. |
| 2014/0052860 A1 | 2/2014 | Duggal et al. |
| 2014/0056290 A1 | 2/2014 | Pazhyannur et al. |
| 2014/0105031 A1 | 4/2014 | McDysan et al. |
| 2014/0105216 A1 | 4/2014 | McDysan |
| 2014/0157042 A1 | 6/2014 | Johnson et al. |
| 2014/0164617 A1 | 6/2014 | Jalan et al. |
| 2014/0192810 A1 | 7/2014 | Hikichi et al. |
| 2014/0241247 A1 | 8/2014 | Kempf et al. |
| 2014/0317276 A1 | 10/2014 | Tie et al. |
| 2014/0321277 A1 | 10/2014 | Lynn, Jr. et al. |
| 2014/0362807 A1 | 12/2014 | Bhatnagar et al. |
| 2014/0376550 A1 | 12/2014 | Khan et al. |
| 2015/0010003 A1 | 1/2015 | Song et al. |
| 2015/0023352 A1 | 1/2015 | Yang et al. |
| 2015/0098472 A1 | 4/2015 | Choi et al. |
| 2015/0201447 A1 | 7/2015 | Li et al. |
| 2015/0215810 A1 | 7/2015 | Andreasen et al. |
| 2015/0288443 A1 | 10/2015 | Foxworthy et al. |
| 2015/0334024 A1 | 11/2015 | Mogul et al. |
| 2015/0334633 A1 | 11/2015 | Zhou et al. |
| 2016/0127149 A1 | 5/2016 | Xue et al. |

FOREIGN PATENT DOCUMENTS

| | | | |
|---|---|---|---|
| CN | 101133598 A | | 2/2008 |
| CN | 101207546 A | | 6/2008 |
| CN | 101572644 A | | 11/2009 |
| CN | 101572664 A | | 11/2009 |
| CN | 101645895 A | | 2/2010 |
| CN | 101827013 A | * | 9/2010 |
| CN | 102025613 A | | 4/2011 |
| CN | 102065471 A | | 5/2011 |
| CN | 102149138 A | * | 8/2011 |
| CN | 102868586 A | | 1/2013 |
| CN | 103188760 A | | 7/2013 |
| CN | 105264835 B | | 12/2016 |
| EP | 2071766 A1 | | 6/2009 |

OTHER PUBLICATIONS

NPD_XP015094477. Xue D Guo Huawei L: Dynamic Stateless GRE tunnel; draft_xue_dhc-dynamic-gre-00.txt , Jul. 9, 2013, total 10 pages.

RFC1701, S. Hanks et al. Generic Routing Encapsulation (GRE), Category: Informational, Oct. 1994, total 8 pages.

RFC2784, D. Farinacci et al. Generic Routing Encapsulation (GRE), Category: Standards Track, Mar. 2000, total 9 pages.

P. Calhoun, Ed. Et al, Control and Provisioning of Wireless Access Points (CAPWAP) Protocol Specification. RFC5415, Mar. 2009, 155 pages.

A Gulbrandsen,:"A DNS RR for specifying the location of services (DNS SRV) status of this memo",rfc2782,total 12 pages.

3GPP TS 23.401 V12.1.0 (Jun. 2013) 3rd Generation Partnership Project;Technical Specification Group Services and System Aspects;General Packet Radio Service (GPRS) enhancements for Evolved Universal Terrestrial Radio Access Network (E-UTRAN) access(Release 12) total 291 pages.

* cited by examiner

METHOD FOR IMPLEMENTING GRE TUNNEL, ACCESS POINT AND GATEWAY

CROSS-REFERENCE TO RELATED APPLICATIONS

This application is a continuation of U.S. patent application Ser. No. 17/083,287, filed on Oct. 28, 2020, which is a continuation of U.S. patent application Ser. No. 14/991,497, filed on Jan. 8, 2016, now U.S. Pat. No. 10,855,491. The U.S. patent application Ser. No. 14/991,497 is a continuation of International Application No. PCT/CN2013/079168, filed on Jul. 10, 2013. All of the aforementioned patent applications are hereby incorporated by reference in their entireties.

TECHNICAL FIELD

Embodiments of the present application relate to communications technologies, and in particular, to a method for implementing a GRE tunnel, an access point, and a gateway.

BACKGROUND

In actual network transmission, an operator usually implements service transmission for a user by configuring a tunnel, such as a virtual local area network (VLAN), and a pseudo wire (PW) tunnel. However, to configure these tunnels, a network and a network device must meet certain functional requirements. For example, when a PW tunnel is configured, both a provider edge device (Provider Edge, PE for short) and a provider core device (P device) on a network need to support label forwarding. Whereas a generic routing encapsulation (GRE) tunnel is a simple data tunnel, in which the tunnel configurations can be ensured only when the edge device of the tunnel is ensured. Therefore, the GRE technology receives extensive attention from equipment vendors and operators.

On a wireless local access network (WLAN), the GRE tunnel is especially useful. Generally, a WLAN network architecture includes an access point (AP), an access controller (AC), and a gateway (GW). The AP is a network element that is deployed on a side of a terminal and is accessed by the terminal. For example, a wireless fidelity (WiFi) hot spot is an AP. The AC is configured to control an access network element, for example, configuration of AP information. The AC may be deployed in a data transmission path and is responsible for routing and forwarding and may also be connected only to the GW and is responsible for access control. The GW, also referred to as a WLAN GW, is a WLAN gateway device and is responsible for managing a WLAN user. The WLAN GW includes functions of a broadband remote access server (BRAS)/a broadband network gateway (BNG) on an operator's network. It is a tendency in the future that a single WLAN GW is deployed to complete various management on the WLAN user, including accounting, policy, quality of service (QoS), and the like.

At present, the WLAN GW serves as a default WLAN gateway. User data of a terminal device of the WLAN, for example, user equipment (UE) or a personal computer (PC), is expected to be sent to the WLAN GW by using a Layer 2 network or a Layer 3 network. In this scenario, a generic data transmission mechanism needs to be provided. Because deployment of a PW and a VLAN has a certain functional requirement for the network and the network device between the AP and the WLAN GW, to reduce a requirement for a transmission network, many equipment vendors and operators all prefer implementing data routing between the AP and the WLAN GW by using the GRE technology.

However, in an existing GRE tunnel, it is necessary to configure addresses of a source node and a destination node as the destination addresses of the tunnel on the source node and the destination node of the GRE tunnel, that is, to implement static configuration of the GRE tunnel. It is very difficult to implement the static configuration due to a large quantity of APs. The configuration not only involves a heavy workload, but also is error-prone, thereby greatly increasing work costs for the operator.

SUMMARY

Embodiments of the present application provide a method for implementing a GRE tunnel, an access point, and a gateway.

According to a first aspect, an embodiment of the present application provides a method for implementing a generic routing encapsulation (GRE) tunnel, including:
  receiving, by an access point (AP), a first packet, where the first packet carries an address of a gateway (GW);
  configuring, by the AP a GRE tunnel to the GW, where a source address of the GRE tunnel is an address of the AP, and a destination address of the GRE tunnel is the address of the GW;
  receiving, by the AP, a second packet sent by user equipment;
  performing, by the AP, GRE tunnel encapsulation for the second packet to form a third packet; and
  sending, by the AP, the third packet to the GW by using the GRE tunnel, where the third packet carries the address of the AP.

In a first possible implementation manner of the first aspect, the receiving, by the AP, the first packet, where the first packet carries the address of a GW, includes:
  receiving, by the AP, a Control And Provisioning of Wireless Access Points (CAPWAP) packet sent by an access controller (AC), where the CAPWAP packet carries the address of the GW.

With reference to the first possible implementation manner of the first aspect, in a second possible implementation manner, the CAPWAP packet includes at least a GW address configuration attribute, and the GW address configuration attribute includes a type field, a length field, and an attribute value field, where a value of the type field is used to identify the attribute as the GW address configuration attribute, and a value of the attribute value field is the address of the GW.

In a third possible implementation manner of the first aspect, the receiving, by the AP, the first packet, where the first packet carries the address of a GW, includes:
  initiating, by the AP, a Remote Authentication Dial In User Service Radius access request to an authentication server through the GW; and
  receiving, by the AP, a Radius access response returned by the GW, where the Radius access response carries the address of the GW.

With reference to the third possible implementation manner of the first aspect, in a fourth possible implementation manner, the Radius access response includes at least a GW address configuration attribute, and the GW address configuration attribute includes a type field, a length field, and an attribute value field, where a value of the type field is used to identify the attribute as the GW address configuration attribute, and a value of the attribute value field is the address of the GW.

According to a second aspect, an embodiment of the present application provides a method for implementing a generic routing encapsulation (GRE) tunnel, including:

sending, by an access point (AP), a fourth packet to a gateway (GW), where the fourth packet carries an address of the AP, and the fourth packet is used to instruct the GW to configure a GRE tunnel to the AP, where a source address of the GRE tunnel is an address of the GW, and a destination address of the GRE tunnel is the address of the AP; and receiving, by the AP, a fifth packet sent by the GW by using the GRE tunnel, where the fifth packet carries the address of the GW, and the fifth packet is used to instruct the AP to configure a GRE tunnel to the GW.

In a first possible implementation manner of the second aspect, the sending, by the AP, the fourth packet to the GW, where the fourth packet carries the address of the AP, includes:

initiating, by the AP, a Radius access request to an authentication server by using the GW, where the Radius access request carries the address of the AP, so that the GW obtains the address of the AP from the Radius access request.

With reference to the first possible implementation manner of the second aspect, in a second possible implementation manner, the Radius access request includes at least an AP address configuration attribute, and the AP address configuration attribute includes a type field, a length field, and an attribute value field, where a value of the type field is used to identify the attribute as the AP address configuration attribute, and a value of the attribute value field is the address of the AP.

According to a third aspect, an embodiment of the present application provides a method for implementing a generic routing encapsulation (GRE) tunnel, including:

sending, by a gateway (GW), a first packet to an access point (AP), where the first packet carries an address of the GW, and the first packet is used to instruct the AP to configure a GRE tunnel to the GW, and a source address of the GRE tunnel is an address of the AP, and a destination address of the GRE tunnel is the address of the GW; and receiving, by the GW, a third packet sent by the AP by using the GRE tunnel, where the third packet carries the address of the AP, and the third packet is used to instruct the GW to configure a GRE tunnel to the AP.

In a first possible implementation manner of the third aspect, the sending, by the GW, the first packet to the AP, where the first packet carries the address of the GW, includes:

receiving, by the GW, a Radius access response returned by an authentication server, and sending the Radius access response that carries the address of the GW to the AP directly or by using an access controller AC.

With reference to the first possible implementation manner of the third aspect, in a second possible implementation manner, the Radius access response includes at least a GW address configuration attribute, and the GW address configuration attribute includes a type field, a length field, and an attribute value field, where a value of the type field is used to identify the attribute as the GW address configuration attribute, and a value of the attribute value field is the address of the GW.

In a third possible implementation manner of the third aspect, the third packet is formed by performing GRE tunnel encapsulation for a second packet after the AP receives the second packet sent by user equipment.

According to a fourth aspect, an embodiment of the present application provides a method for implementing a generic routing encapsulation (GRE) tunnel, including:

receiving, by a gateway (GW), a fourth packet sent by an access point (AP), where the fourth packet carries an address of the AP;

configuring, by the GW, a GRE tunnel to the AP, where a source address of the GRE tunnel is an address of the GW, and a destination address of the GRE tunnel is the address of the AP; and sending, by the GW, a fifth packet to the AP by using the GRE tunnel, where the fifth packet carries the address of the GW, and the fifth packet is used to instruct the AP to configure a GRE tunnel to the GW.

According to a fifth aspect, an embodiment of the present application provides an access point, including:

a first receiving module, configured to receive a first packet, where the first packet carries an address of a gateway GW;

a first configuring module, configured to configure a GRE tunnel to the GW, where a source address of the GRE tunnel is an address of the AP, and a destination address of the GRE tunnel is the address of the GW;

a second receiving module, configured to receive a second packet sent by user equipment;

an encapsulating module, configured to perform GRE tunnel encapsulation for the second packet to form a third packet; and a first sending module, configured to send the third packet to the GW by using the GRE tunnel, where the third packet carries the address of the AP.

In a first possible implementation manner of the fifth aspect, the first receiving module is specifically configured to receive a Control And Provisioning of Wireless Access Points (CAPWAP) packet sent by an access controller AC, and the CAPWAP packet carries the address of the GW.

With reference to the first possible implementation manner of the fifth aspect, in a second possible implementation manner, the CAPWAP packet includes at least a GW address configuration attribute, and the GW address configuration attribute includes a type field, a length field, and an attribute value field, where a value of the type field is used to identify the attribute as the GW address configuration attribute, and a value of the attribute value field is the address of the GW.

In a third possible implementation manner of the fifth aspect, the first receiving module is specifically configured to initiate a Radius access request to an authentication server by using the GW, and receive a Radius access response returned by the GW, where the Radius access response carries the address of the GW.

With reference to the third possible implementation manner of the fifth aspect, in a fourth possible implementation manner, the Radius access response includes at least a GW address configuration attribute, and the GW address configuration attribute includes a type field, a length field, and an attribute value field, where a value of the type field is used to identify the attribute as the GW address configuration attribute, and a value of the attribute value field is the address of the GW.

According to a sixth aspect, an embodiment of the present application provides an access point, including:

a second sending module, configured to send a fourth packet to a gateway (GW), where the fourth packet carries an address of an AP, and the fourth packet is used to instruct the GW to configure a GRE tunnel to the AP, where a source address of the GRE tunnel is an address of the GW, and a destination address of the GRE tunnel is the address of the AP; and a third receiving module, configured to receive a fifth packet sent by the GW by using the GRE tunnel, where the fifth packet carries the address of the GW, and the fifth packet is used to instruct the AP to configure the GRE tunnel to the GW.

In a first possible implementation manner of the sixth aspect, the second sending module is specifically configured to initiate a Radius access request to an authentication server by using the GW, where the Radius access request carries an address of the AP, so that the GW obtains the address of the AP from the Radius access request.

With reference to the first possible implementation manner of the sixth aspect, in a second possible implementation manner, the Radius access request includes at least an AP address configuration attribute, and the AP address configuration attribute includes a type field, a length field, and an attribute value field, where a value of the type field is used to identify the attribute as the AP address configuration attribute, and a value of the attribute value field is the address of the AP.

According to a seventh aspect, an embodiment of the present application provides a gateway, including:

a third sending module, configured to send a first packet to an access point AP, where the first packet carries an address of a GW, and the first packet is used to instruct the AP to configure a GRE tunnel to the GW, where a source address of the GRE tunnel is an address of the AP, and a destination address of the GRE tunnel is the address of the GW; and a fourth receiving module, configured to receive a third packet sent by the AP by using the GRE tunnel, where the third packet carries the address of the AP, and the third packet is used to instruct the GW to configure a GRE tunnel to the AP.

In a first possible implementation manner of the seventh aspect, the third sending module is specifically configured to receive a Radius access response returned by an authentication server, and send the Radius access response that carries the address of the GW to the AP directly or by using an access controller (AC).

With reference to the first possible implementation manner of the seventh aspect, in a second possible implementation manner, the Radius access response includes at least a GW address configuration attribute, and the GW address configuration attribute includes a type field, a length field, and an attribute value field, where a value of the type field is used to identify the attribute as the GW address configuration attribute, and a value of the attribute value field is the address of the GW.

In a third possible implementation manner of the seventh aspect, the third packet is formed by performing GRE tunnel encapsulation for a second packet after the AP receives the second packet sent by user equipment.

According to an eighth aspect, an embodiment of the present application provides a gateway (GW), including:

a fifth receiving module, configured to receive a fourth packet sent by an access point (AP), where the fourth packet carries an address of the AP;

a second configuring module, configured to configure a GRE tunnel to the AP, where a source address of the GRE tunnel is an address of the GW, and a destination address of the GRE tunnel is the address of the AP; and a fourth sending module, configured to send a fifth packet to the AP by using the GRE tunnel, where the fifth packet carries the address of the GW, and the fifth packet is used to instruct the AP to configure a GRE tunnel to the GW.

Embodiments of the present application provide a method for implementing a GRE tunnel, an access point, and a gateway. There is no need to separately store an address of a peer end in an AP and a GW by using static configuration. Instead, the AP and the GW obtain and store the address of the peer end in a dynamic interaction process. In addition, data interacted in the GRE tunnel is encapsulated and sent by using the address of the peer end as a destination address without a need to maintain a status of the GRE tunnel. Therefore, a dynamic GRE tunnel can be flexibly and easily established, and signaling costs are low.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall fall within the protection scope of the present application.

Embodiment 1

Figure 1:
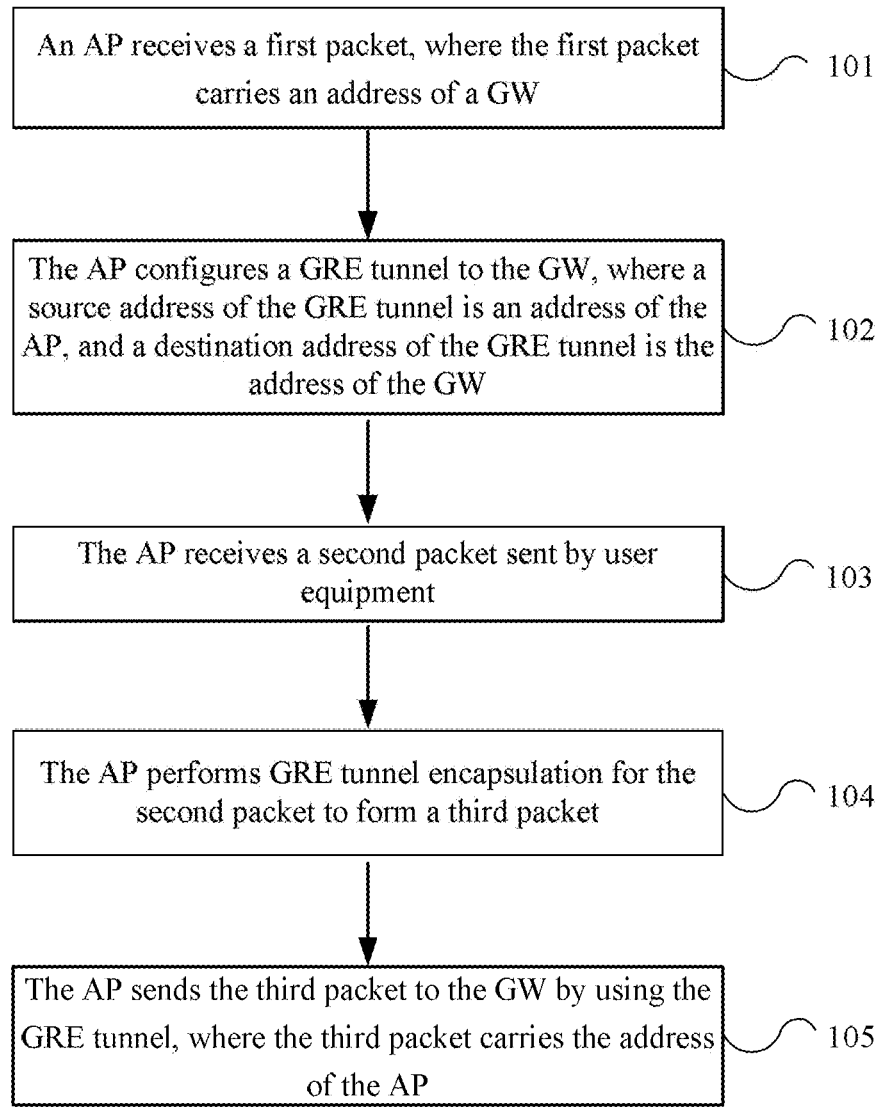
FIG. 1 is a flowchart of a method for implementing a GRE tunnel according to Embodiment 1 of the present application.

FIG. 1 is a flowchart of a method for implementing a GRE tunnel according to Embodiment 1 of the present application. The method may be applicable to establishment of a GRE tunnel between an AP and a GW. There are multiple types of network architectures that include the AP and the GW. These architectures are all applicable to a technical solution of this embodiment. For example, this embodiment is applicable to establishment of a GRE tunnel in a scenario of a heterogeneous access network, and is also applicable to establishment of a GRE tunnel in a scenario of a WLAN network. Specific implementation solutions under a variety of network architectures are described in detail in subsequent embodiments.

The method of this embodiment may be implemented by an access point on a terminal side. As shown in FIG. 1, the method may be performed according to the following process:

101: The AP receives a first packet, where the first packet carries an address of the GW.

102: The AP configures a GRE tunnel to the GW, where a source address of the GRE tunnel is an address of the AP, and a destination address of the GRE tunnel is the address of the GW.

103: The AP receives a second packet sent by user equipment.

104: The AP performs GRE tunnel encapsulation for the second packet to form a third packet.

105: The AP sends the third packet to the GW by using the GRE tunnel, where the third packet carries the address of the AP.

In the technical solution of this embodiment, the first packet may be a newly-defined packet, and may also use a conventional packet that used in various interaction processes, for example, a packet based on the Control And Provisioning of Wireless Access Points (CAPWAP), and a packet in a process of Radius authentication, so long as the packet enables the AP and the GW to obtain corresponding addresses. In this embodiment, there is no need to separately store an address of a peer end in the AP and the GW by using static configuration. Instead, the AP and the GW obtain and store the address of the peer end in a dynamic interaction process. In addition, data interacted in the GRE tunnel is actually encapsulated and sent by using the address of the peer end as a destination address without a need to maintain a status of the GRE tunnel. Therefore, a dynamic GRE tunnel can be flexibly and easily established, and signaling costs are low.

The technical solution of this embodiment of the present application may be applicable to a variety of network architectures, and be implemented by using an existing process. Details are described as follows:

Embodiment 2

Figure 2A:
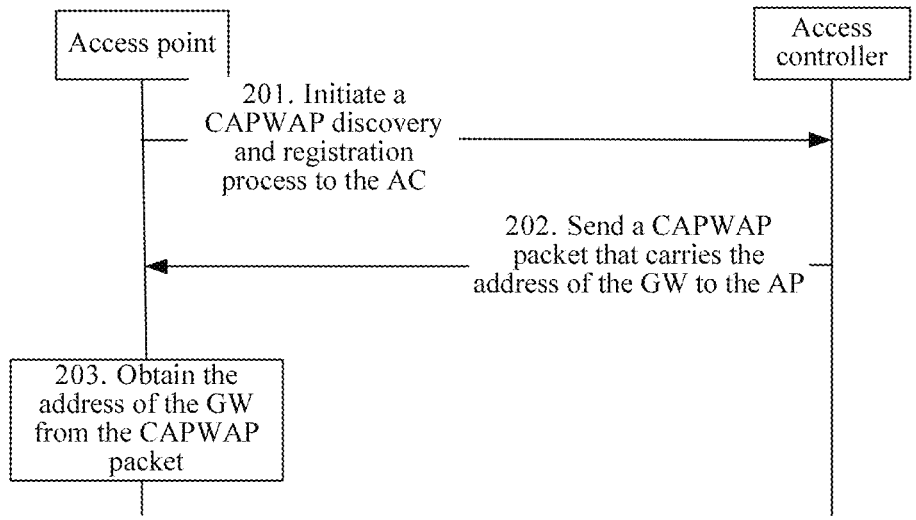
FIG. 2A is a signaling flowchart of a method for implementing a GRE tunnel according to Embodiment 2 of the present application.
Figure 2B:
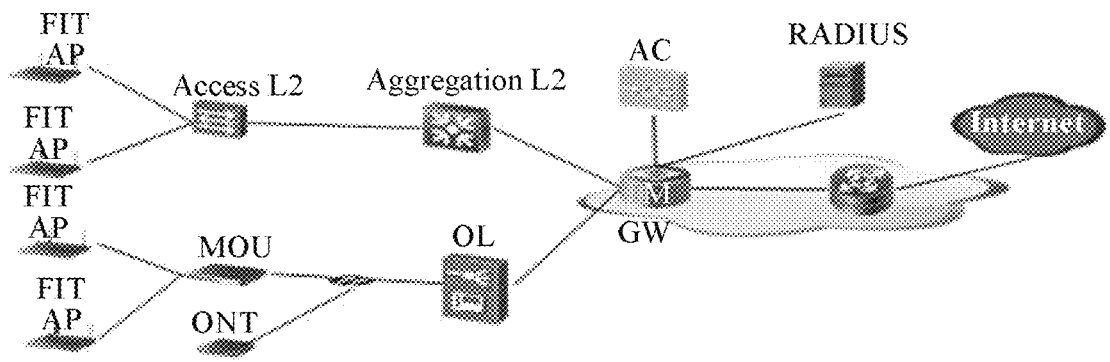
FIG. 2B to FIG. 2D are schematic diagrams of a network architecture that is applicable to Embodiment 2 of the present application.
Figure 2C:
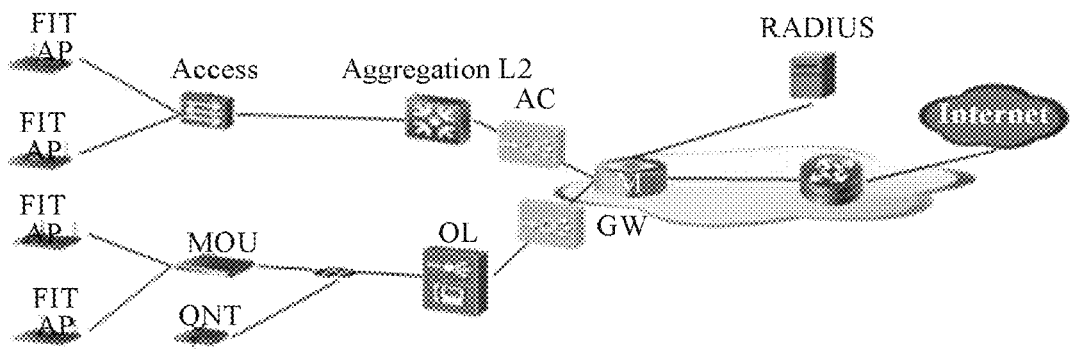
Figure 2D:
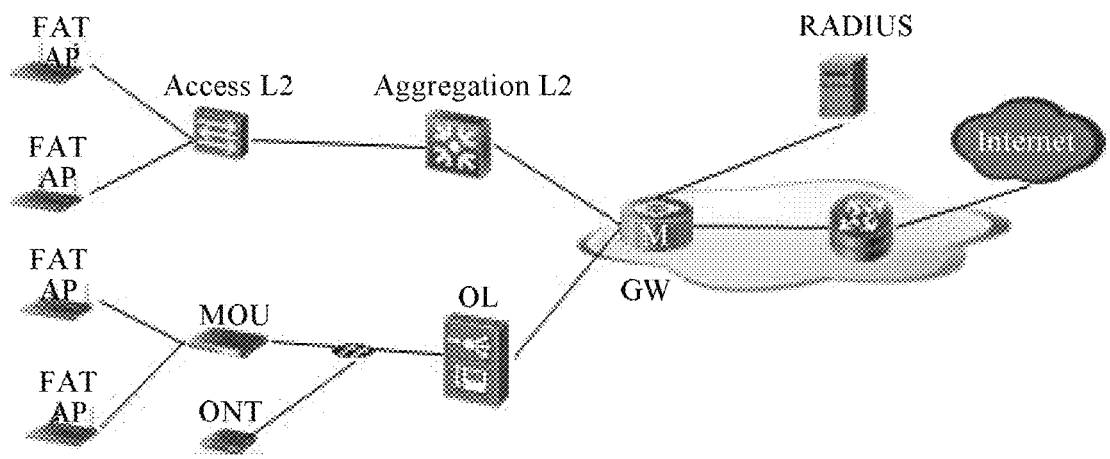

FIG. 2A is a signaling flowchart of a method for implementing a GRE tunnel according to Embodiment 2 of the present application. FIG. 2B to FIG. 2D are schematic diagrams of a network architecture that is applicable to Embodiment 2 of the present application. As shown in FIG. 2B, FIG. 2C, and FIG. 2D, the network is a WLAN network that mainly includes an AP, an AC, and a GW. In FIG. 2B, the AC is in bypass mode, and data is forwarded by each AP. In FIG. 2C, the AC is located in a data forwarding path, the data transmitted by each AP is collectively forwarded by the AC. In FIG. 2D, the AC and the GW are integrated, which means that the GW combines a function of the AC; alternatively, the AC may be integrated with the AP, and the function of the AC is implemented by the AP.

With regard to a network condition of the WLAN, in this embodiment, the AP specifically obtains an address of the GW by using a packet interacted between the AP and the AC.

201: The AP initiates a CAPWAP discovery and registration process to the AC.

After the AP powers on and starts, the AP initiates the CAPWAP discovery and registration process to the AC.

202: The AC sends a CAPWAP packet that carries the address of the GW to the AP.

In a data negotiation process between the AP and the AC, the AC configures the address of the GW for the AP by using a CAPWAP protocol.

203: The AP obtains the address of the GW from the CAPWAP packet.

In 203, the AP receives the CAPWAP packet sent by the AC, and obtains the address of the GW from the CAPWAP packet. Herein, the CAPWAP packet is equivalent to a first packet, and the AP may obtain the address of the GW from the first packet. In different network architectures, the CAPWAP packet may be sent by the AC, or by a network element that functions as the AC.

In the foregoing embodiment, the AP receives the CAPWAP packet sent by the AC, where the CAPWAP packet carries the address of the GW. The CAPWAP packet is used to configure the address of the GW for the AP; therefore, no additional process is required, and this facilitates improvement and popularization.

This embodiment may specifically implement the configuration of the address of the GW by adding an attribute to a CAPWAP packet. The CAPWAP packet includes at least a GW address configuration attribute, and the GW address configuration attribute includes a type field, a length field, and an attribute value field, where a value of the type field is used to identify the attribute as the GW address configuration attribute, and a value of the attribute value field is the address of the GW. For example, the CAPWAP packet may be a configuration state response packet in the CAPWAP. The packet carries the GW address configuration attribute, that is, a GW Address element.

A format of the CAWWAP configuration state response packet is as follows:

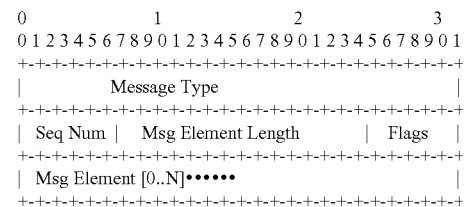

A format of the GW Address element is defined as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |
+-+-+-+-+-+-+-+-+-+-+-+-+-+-+-+-+-+-+-+-+-+-+-+-+-+-+-+-+-+-+-+-+
|   Value ...   |
+-+-+-+-+-+-+-+-+
```

Type indicates that a type of the element is GW Address element, and a value that does not conflict with RFC5415 can be selected. Length indicates a length of the value. The value is, for example, an IP address of the GW. The IP address may be an IPv4 address or an IPv6 address. When load balancing is used, the value may be a plurality of GW addresses that implement the load balancing and a cost value of the GW.

Embodiment 3

Figure 3A:
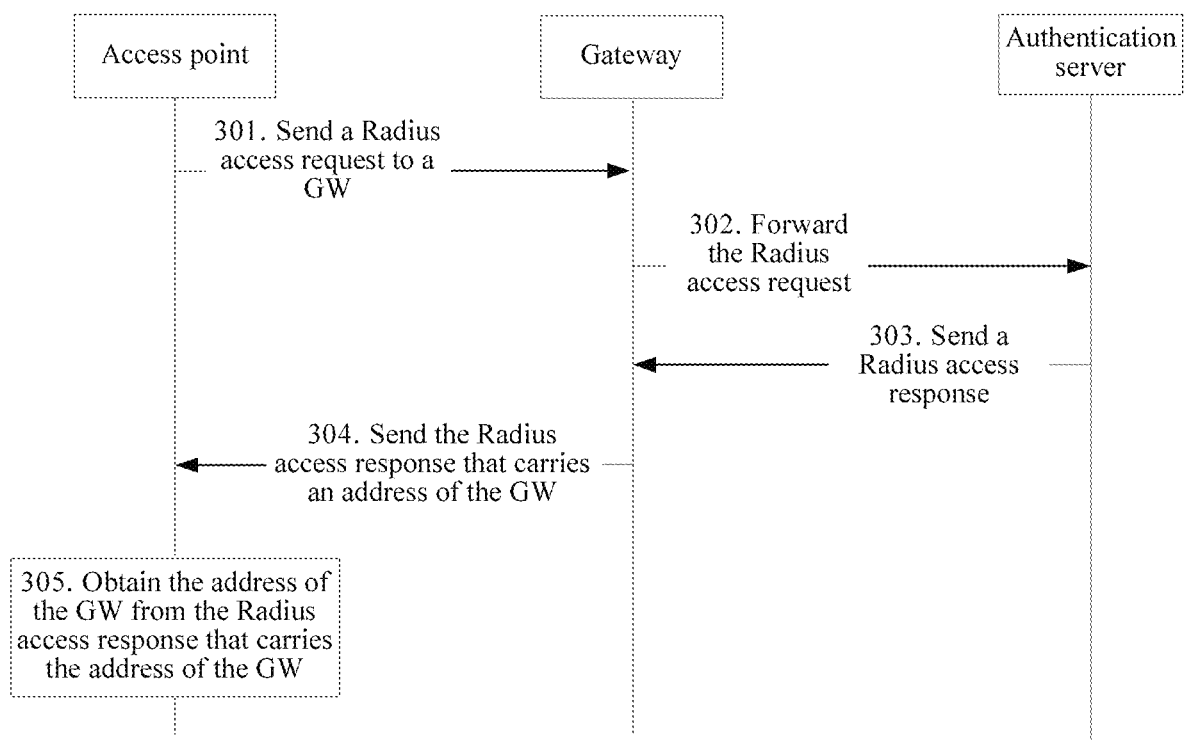
FIG. 3A is a signaling flowchart of a method for implementing a GRE tunnel according to Embodiment 3 of the present application.

FIG. 3A is a signaling flowchart of a method for implementing a GRE tunnel according to Embodiment 3 of the present application. This embodiment provides another implementation manner that an AP obtains an address of a GW. As shown in FIG. 3A, the method includes the following:

301: The AP sends a Radius access request to the GW.

Specifically, when the AP powers on and starts, the AP initiates a user access authentication process, that is, the AP sends the Radius access request.

302: The GW forwards the Radius access request to an authentication server.

303: The authentication server sends a Radius access response to the GW.

304: The GW sends the Radius access response that carries the address of the GW to the AP.

305: The AP obtains the address of the GW from the Radius access response that carries the address of the GW.

In the foregoing embodiment, the AP initiates the Radius access request to the authentication server by using the GW; and the AP receives the Radius access response returned by the GW, where the Radius access response carries the address of the GW. The foregoing solution may be applicable to a WLAN network shown in FIG. 2B to FIG. 2D, and may also be applicable to a heterogeneous access network. On the WLAN network shown in FIG. 2C, only a rule that the AC forwards a Radius access request to the GW and that the AC forwards a Radius access response to the AP need to be added. Details are not described herein again.

Aggregation of the AC and the GW on the WLAN network is used as an example. As shown in FIG. 2D, the AP initiates a Radius access request to the authentication server by using the GW. The authentication server may be an authentication authorization accounting (AAA) proxy. That is, after the AP initiates a user authentication process to the GW, the GW initiates the Radius access request to the authentication server. When the authentication server returns the Radius access response to the AP by using the GW, the GW includes its own address in the Radius access response, and the AP obtains the address of the GW from the Radius access response after the AP receives the Radius access response.

Figure 3B:
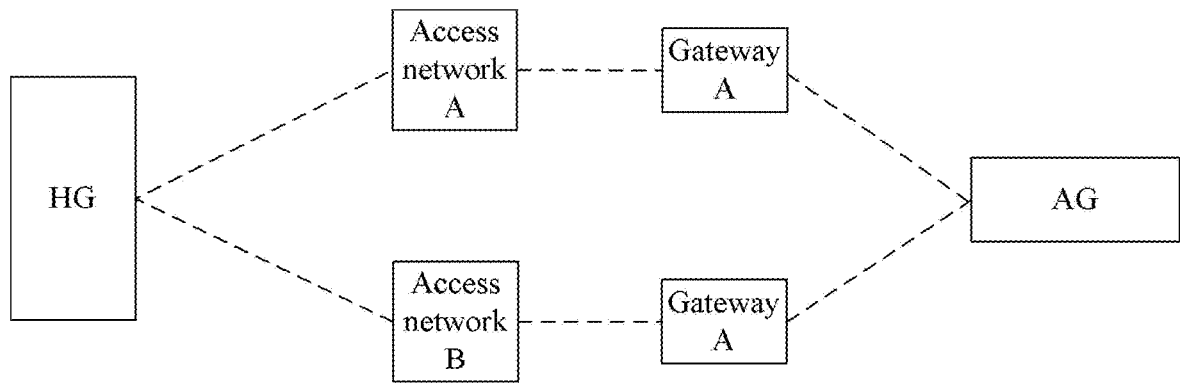
FIG. 3B is a schematic structural diagram of a heterogeneous access network that is applicable to Embodiment 3 of the present application.

FIG. 3B is a schematic structural diagram of the heterogeneous access network that is applicable to Embodiment 3 of the present application. As shown in FIG. 3B, the network includes: a home gateway (HG), an access network A and an access network B that run different network protocols, a gateway A, a gateway B, and an aggregation gateway (AG). The HG is equivalent to the AP, and the AG is equivalent to the GW. An independent AC may not be set; instead, a function of the AC may be integrated into another network element. The heterogeneous access network mainly refers to an access network of an aggregation architecture that is formed by interconnecting access networks running different network protocols, for example, an access network formed by interconnection of different protocol clusters such as the Transmission Control Protocol (TCP)/Internet Protocol (IP), and the Internetwork Packet Exchange protocol (IPX)/Sequenced Packet Exchange protocol (SPX). User access bandwidth may be enhanced by binding multiple links.

In a scenario of the heterogeneous access network, the HG initiates the Radius access request to the authentication server by using the AG. When the Radius access response returned by the authentication server is returned to the HG by using the AG, the AG includes its own address in the Radius access response, and the HG obtains the address of the AG from the Radius access response.

In this embodiment, the Radius access response includes at least a GW address configuration attribute, and the GW address configuration attribute includes a type field, a length field, and an attribute value field, where a value of the type field is used to identify the attribute as the GW address configuration attribute, and a value of the attribute value field is the address of the GW. An advantage in doing this is that it may reduce a signaling overhead for establishing a GRE tunnel, and improve efficiency in establishing the GRE tunnel. For example, the GW address configuration attribute included in the Radius access response may be an extended Radius attribute that carries the address of the GW. A format of the attribute is:

```
 0                   1                   2
 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+
|   Type    |   Length    |    String      |
+-+-+-+-+-+-+-+-+-+-+-+-+-+-+-+-+-+-+-+-+-+-+
```

A value of Type is a reserved value. Length indicates a length of a string. String indicates, for example, an IP address of the GW. The address may be an IPv4 address or an IPv6 address.

Embodiment 4

Figure 4:
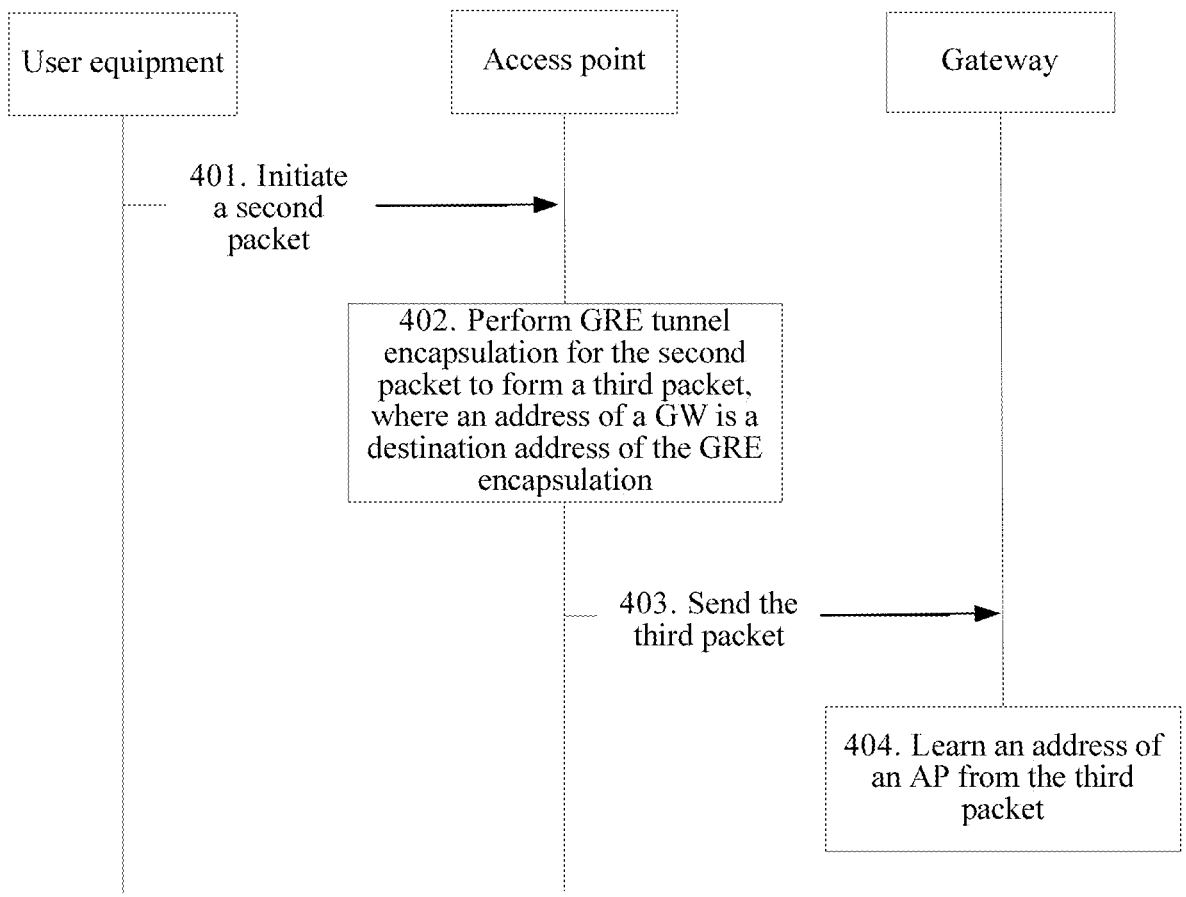
FIG. 4 is a signaling flowchart of a method for implementing a GRE tunnel according to Embodiment 4 of the present application.

FIG. 4 is a signaling flowchart of a method for implementing a GRE tunnel according to Embodiment 4 of the present application. The method provides a manner for configuring an address of an AP for a GW. As shown in FIG. 4, the method may include the following:

401: User equipment sends a second packet to the AP.

402: The AP performs GRE tunnel encapsulation for the second packet to form a third packet, where an address of the GW is a destination address of the GRE encapsulation.

403: The AP sends the third packet to the GW.

404: The GW learns the address of the AP from the third packet.

In the foregoing embodiment, after the address of the GW is configured as a destination address of the GRE tunnel on an AP side, the AP encapsulates and sends upstream data to be sent, so that the GW obtains the address of the AP from the upstream data, where the destination address of the GRE tunnel on the AP side is adopted as the destination address of the encapsulation. This embodiment may also be applicable to the scenarios shown in FIG. 2B to FIG. 2D, and may also be applicable to the heterogeneous access network shown in FIG. 3B.

Embodiment 5

Figure 5:
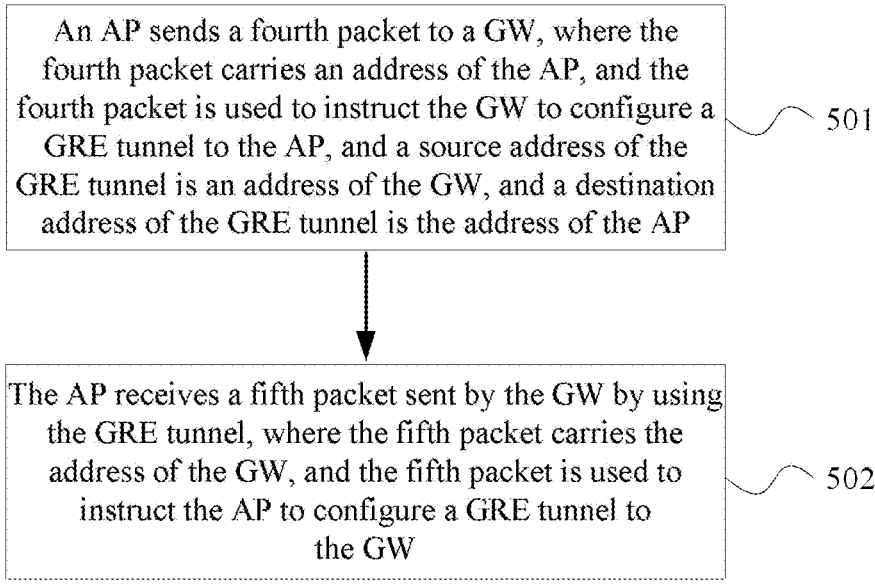
FIG. 5 is a flowchart of a method for implementing a GRE tunnel according to Embodiment 5 of the present application.

FIG. 5 is a flowchart of a method for implementing a GRE tunnel according to Embodiment 5 of the present application. This method may also be applicable to a variety of network architectures of an AP and a GW. The method of this embodiment may be implemented by an access point on a terminal side. As shown in FIG. 5, the method may be performed according to the following process:

501: The AP sends a fourth packet to the GW, where the fourth packet carries an address of the AP, and the fourth packet is used to instruct the GW to configure a GRE tunnel to the AP, and a source address of the GRE tunnel is an address of the GW, and a destination address of the GRE tunnel is the address of the AP.

502: The AP receives a fifth packet sent by the GW by using the GRE tunnel, where the fifth packet carries the address of the GW, and the fifth packet is used to instruct the AP to configure a GRE tunnel to the GW.

In a technical solution of this embodiment, the fourth packet may be a newly-defined packet, and may also use an existing packet in various interaction processes, for example, a CAPWAP-based packet, and a packet in a process of Radius authentication, so long as the packet enables the AP and the GW to obtain corresponding addresses. In this embodiment, there is no need to separately store an address of a peer end in the AP and the GW by using static configuration. Instead, the AP and the GW obtain and store the address of the peer end in a dynamic interaction process. In addition, data interacted in the GRE tunnel is actually encapsulated and sent by using the address of the peer end as a destination address without a need to maintain a status of the GRE tunnel. Therefore, a dynamic GRE tunnel can be flexibly and easily established, and signaling costs are low.

The technical solution of this embodiment of the present application may be applicable to a variety of network architectures, and be implemented by using an existing process. Details are described as follows:

Embodiment 6

Figure 6:
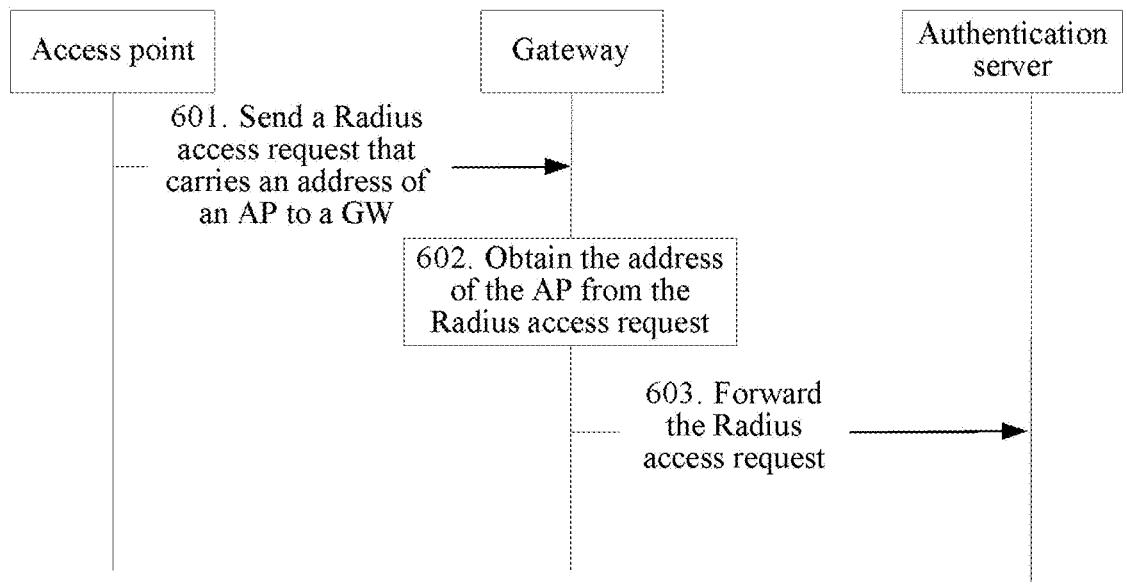
FIG. 6 is a signaling flowchart of a method for implementing a GRE tunnel according to Embodiment 6 of the present application.

FIG. 6 is a signaling flowchart of a method for implementing a GRE tunnel according to Embodiment 6 of the present application. As shown in FIG. 6, this embodiment provides a manner used by a GW to obtain an address of an AP. The method specially includes:

601: The AP sends a Radius access request that carries the address of the AP to the GW.
602: The GW obtains the address of the AP from the Radius access request.
603: The GW forwards the Radius access request to an authentication server.

In the foregoing embodiment, the AP initiates the Radius access request to the authentication server by using the GW, where the Radius access request carries the address of the AP, so that the GW obtains the address of the AP from the Radius access request. The foregoing solution may be applicable to the WLAN network shown in FIG. 2B to FIG. 2D, and may also be applicable to the heterogeneous access network shown in FIG. 3B.

An AC that is deployed in a data transmission path on a WLAN network and is responsible for route forwarding is used as an example. As shown in FIG. 2C, when the AP accesses the WLAN network, the AC completes a user authentication process. That is, the AP initiates, by using the AC, the Radius access request to the authentication server by using the GW, and the AP includes its own address in the Radius access request. The GW obtains the address of the AP from the Radius access request when the Radius access request passes the GW.

In a scenario of the heterogeneous access network, when an HG initiates the Radius access request to the authentication server by using an AG, the HG includes its own address in the Radius access request. The AG obtains the address of the HG from the Radius access request when the Radius access request passes the AG.

In this embodiment, the Radius access request includes at least an AP address configuration attribute, and the AP address configuration attribute includes a type field, a length field, and an attribute value field, where a value of the type field is used to identify the attribute as the AP address configuration attribute, and a value of the attribute value field is the address of the AP. An advantage in doing this is that it may reduce a signaling overhead for establishing the GRE tunnel, and improve efficiency in establishing the GRE tunnel. For example, the AP address configuration attribute included in the Radius access request may be an extended Radius attribute that carries the address of the AP. A format of the attribute is:

```
 0                   1                   2
 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+
|    Type    |   Length   |    String    |
+-+-+-+-+-+-+-+-+-+-+-+-+-+-+-+-+-+-+-+-+-+-+
```

A value of Type is a reserved value. Length indicates a length of a string. String indicates, for example, an IP address of the AP. The address may be an IPv4 address or an IPv6 address.

Optionally, on the basis of the foregoing embodiment, if the AP obtains two or more addresses of the GW, the AP obtains an access cost of each GW from a first address configuration message, and selects a GW with a lower access cost. The AP configures an address of the GW with a lower access cost locally as a destination address of the GRE tunnel.

Embodiment 7

Figure 7:
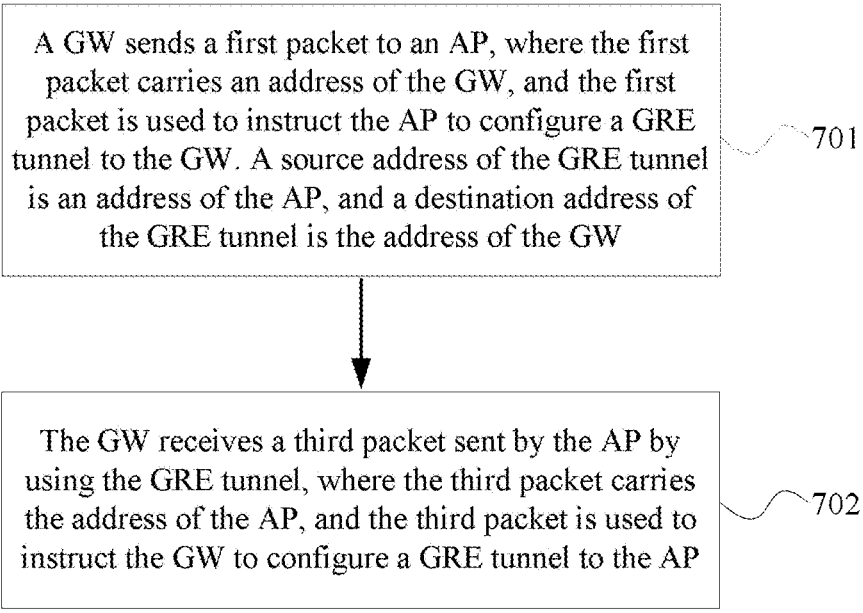
FIG. 7 is a flowchart of a method for implementing a GRE tunnel according to Embodiment 7 of the present application.

FIG. 7 is a flowchart of a method for implementing a GRE tunnel according to Embodiment 7 of the present application. The method may be applicable to establishment of a GRE tunnel between an AP and a GW. There are a variety of network architectures that include the AP and the GW. The network architectures may all be applicable to a technical solution of this embodiment. The method of this embodiment may be implemented by a GW on a network side. As shown in FIG. 7, the method may be performed according to the following process:

701: The GW sends a first packet to the AP, where the first packet carries an address of the GW, and the first packet is used to instruct the AP to configure a GRE tunnel to the GW.

A source address of the GRE tunnel is an address of the AP, and a destination address of the GRE tunnel is the address of the GW.

702: The GW receives a third packet sent by the AP by using the GRE tunnel, where the third packet carries the address of the AP, and the third packet is used to instruct the GW to configure a GRE tunnel to the AP.

In this embodiment, the first packet may be a newly-defined packet, and may also use an existing packet in various interaction processes, for example, a CAPWAP-based packet and a packet in a process of Radius authentication, so long as the packet enables the AP and the GW to obtain corresponding addresses. In this embodiment, there is no need to separately store an address of a peer end in the AP and the GW by using static configuration. Instead, the AP and the GW obtain and store the address of the peer end in a dynamic interaction process. In addition, data interacted in the GRE tunnel is actually encapsulated and sent by using the address of the peer end as a destination address without a need to maintain a status of the GRE tunnel. Therefore, a dynamic GRE tunnel can be flexibly and easily established, and signaling costs are low.

That the GW sends a first packet to the AP may specifically be: the GW receives a Radius access response returned by an authentication server, and sends the Radius access response that carries the address of the GW to the AP directly or by using an AC. Refer to the process described in the foregoing Embodiment 3. Details are not described herein again.

In this embodiment, the Radius access response includes at least a GW address configuration attribute, and the GW address configuration attribute includes a type field, a length field, and an attribute value field, where a value of the type field is used to identify the attribute as the GW address configuration attribute, and a value of the attribute value field is the address of the GW. Refer to the process of Embodiment 3. Details are not described herein again.

That the GW receives a third packet sent by the AP may specifically be: the GW receives upstream data sent by the AP by using the GRE tunnel, where a destination address for encapsulating the upstream data is the address of the GW, and the GW obtains, by parsing, the address of the AP from the upstream data. That is, the third packet is formed by encapsulating the upstream data; in other words, the third packet is formed by performing GRE tunnel encapsulation for a second packet after the AP receives the second packet sent by user equipment. Refer to the process described in the foregoing Embodiment 4. Details are not described herein again.

Embodiment 8

Figure 8:
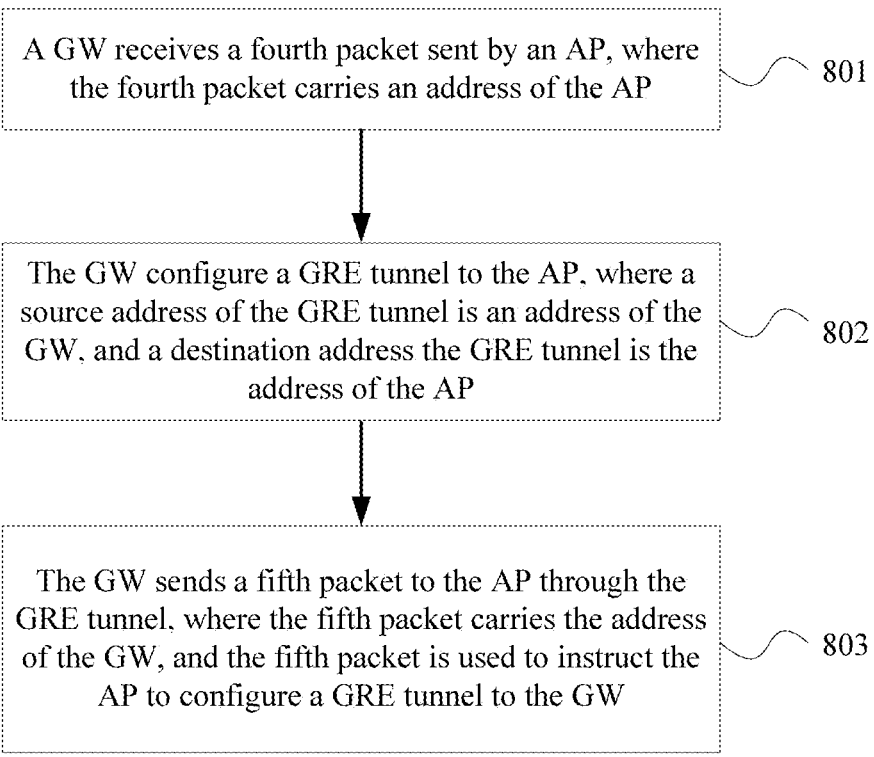
FIG. 8 is a flowchart of a method for implementing a GRE tunnel according to Embodiment 8 of the present application.

FIG. 8 is a flowchart of a method for implementing a GRE tunnel according to Embodiment 8 of the present application. The method may be applicable to establishment of the GRE tunnel between an AP and a GW. There are a variety of network architectures that include the AP and the GW, and the network architectures may all be applicable to a technical solution of the embodiment. The method of this embodiment may be implemented by a GW on a network side. As shown in FIG. 8, the method may be performed according to the following process:

801: The GW receives a fourth packet sent by the AP, where the fourth packet carries an address of the AP.

802: The GW configure a GRE tunnel to the AP, where a source address of the GRE tunnel is an address of the GW, and a destination address the GRE tunnel is the address of the AP.

803: The GW sends a fifth packet to the AP by using the GRE tunnel, where the fifth packet carries the address of the GW, and the fifth packet is used to instruct the AP to configure the GRE tunnel to the GW.

In this embodiment, the fourth packet may be a newly-defined packet, and may also use an existing packet in various interaction processes, for example, a CAPWAP-based packet, and a packet in a process of Radius authentication, so long as the packet enables the AP and the GW to obtain corresponding addresses. In this embodiment, there is no need to separately store an address of a peer end in the AP and the GW by using static configuration. Instead, the AP and the GW obtain and store the address of the peer end in a dynamic interaction process. In addition, data interacted in the GRE tunnel is actually encapsulated and sent by using the address of the peer end as a destination address without a need to maintain a status of the GRE tunnel. Therefore, a dynamic GRE tunnel can be flexibly and easily established, and signaling costs are low.

That the GW receives a fourth packet sent by the AP may specifically be: the GW receives a Radius access response returned by an authentication server, and the GW sends Radius access response that carries the address of the GW to the AP directly or by using an AC, so that the AP obtains the address of the GW from the Radius access response. Refer to the process described in the foregoing Embodiment 3. Details are not described herein again.

Optionally, on the basis of the foregoing embodiment, the method may further include: the GW sends its own access cost to the AP, so that the AP selects a GW according to access costs of at least two GWs. Specifically, to prevent a data transmission failure of the GRE tunnel caused by a fault, multiple GRE tunnels may be configured for the AP. In this case, when the AP selects the GRE tunnel to transmit data, it may weigh and preferentially select, according to an access cost (for example, a cost value) of a GW at the peer end of the GRE tunnel, a GRE tunnel with a lower access cost. An advantage in doing this is that it may provide an alternative GRE tunnel for data transmission, and ensure reliability of the data transmission.

Optionally, on the basis of the foregoing embodiment, the address of the AP or the address of the GW may be an IP address of the AP or an IP address of the GW.

Embodiment 9

Figure 9:
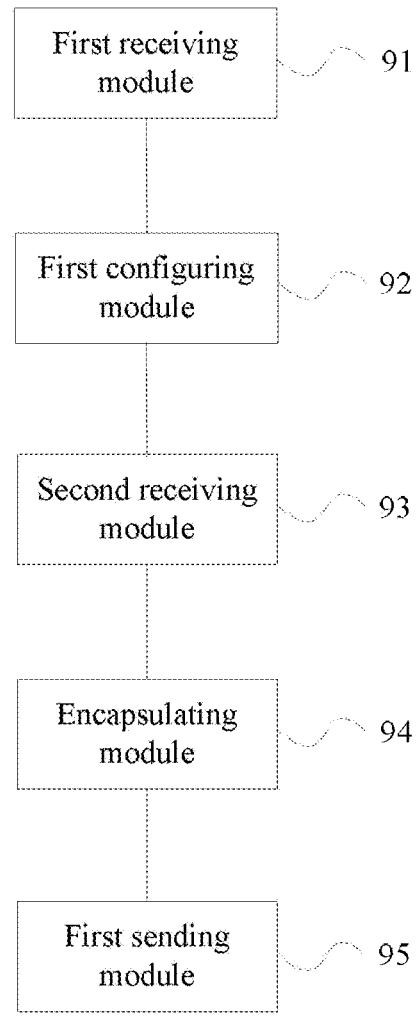
FIG. 9 is a schematic structural diagram of an access point according to Embodiment 9 of the present application.

FIG. 9 is a schematic structural diagram of an access point according to Embodiment 9 of the present application. As shown in FIG. 9, the access point may include: a first receiving module 91, a first configuring module 92, a second receiving module 93, an encapsulating module 94, and a first sending module 95, where the first receiving module 91 may be configured to receive a first packet, and the first packet carries an address of a GW; the first configuring module 92 may be configured to configure a GRE tunnel to the GW, where a source address of the GRE tunnel is an address of the AP, and a destination address of the GRE tunnel is the address of the GW; the second receiving module 93 may be configured to receive a second packet sent by user equipment; the encapsulating module 94 may be configured to perform the GRE tunnel encapsulation for the second packet to form a third packet; and the first sending module 95 may be configured to send the third packet to the GW by using the GRE tunnel, where the third packet carries the address of the AP.

Optionally, the first receiving module 91 is specifically configured to receive a Control and Provisioning of Wireless Access Points CAPWAP packet sent by an AC, where the CAPWAP packet carries the address of the GW.

Optionally, the CAPWAP packet includes at least a GW address configuration attribute, and the GW address configuration attribute includes a type field, a length field, and an attribute value field, where a value of the type field is used to identify the attribute as the GW address configuration attribute, and a value of the attribute value field is the address of the GW.

Optionally, the first receiving module 91 is specifically configured to initiate a Radius access request to an authentication server by using the GW, and receive a Radius access response returned by the GW, where the Radius access response carries the address of the GW.

Optionally, the Radius access response includes at least the GW address configuration attribute, and the GW address configuration attribute includes the type field, the length field, and the attribute value field, where the value of the type field is used to identify the attribute as the GW address configuration attribute, and the value of the attribute value field is the address of the GW.

An apparatus in this embodiment may be used to perform the technical solution in method embodiments shown in FIG. 1 to FIG. 4. For a specific function, refer to the foregoing method embodiments. Details are not described herein again.

Embodiment 10

Figure 10:
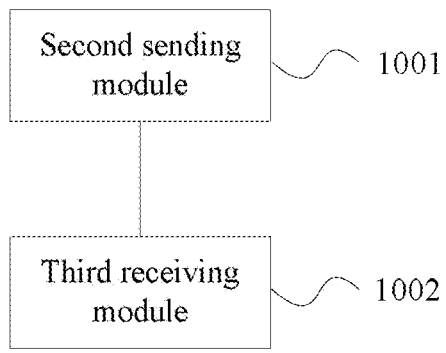
FIG. 10 is a schematic structural diagram of an access point according to Embodiment 10 of the present application.

FIG. 10 is a schematic structural diagram of an access point according to Embodiment 10 of the present application. As shown in FIG. 10, the access point may include: a second sending module 1001 and a third receiving module 1002, where the second sending module 1001 may be configured to send a fourth packet to a GW, and the fourth packet carries an address of an AP and is used to instruct the GW to configure a GRE tunnel to the AP, where a source address of the GRE tunnel is an address the GW, and a destination address of the GRE tunnel is the address of the AP. The third receiving module 1002 may be configured to receive a fifth packet sent by the GW by using the GRE tunnel, where the fifth packet carries the address of the GW, and the fifth packet is used to instruct the AP to configure a GRE tunnel to the GW.

Optionally, the second sending module 1001 is specifically configured to initiate a Radius access request to an authentication server via the GW, where the Radius access request carries the address of the AP, so that the GW obtains the address of the AP from the Radius access request.

Optionally, the Radius access request includes at least an AP address configuration attribute, and the AP address configuration attribute includes a type field, a length field, and an attribute value field, where a value of the type field is used to identify the attribute as the AP address configuration attribute, and a value of the attribute value field is the address of the AP.

An apparatus of this embodiment may be used to perform the technical solution in method embodiments shown in FIG. 5 and FIG. 6. For a specific function, refer to the foregoing method embodiments. Details are not described herein again.

Embodiment 11

Figure 11:
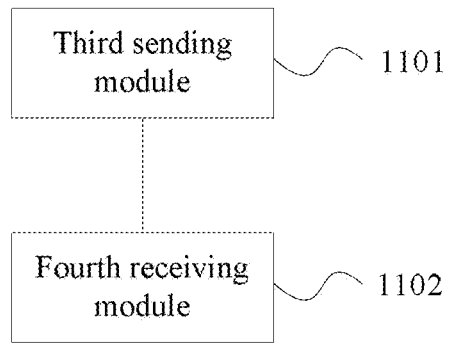
FIG. 11 is a schematic structural diagram of a gateway according to Embodiment 11 of the present application.

FIG. 11 is a schematic structural diagram of a gateway according to Embodiment 11 of the present application. As shown in FIG. 11, the gateway may include: a third sending module 1101 and a fourth receiving module 1102, where the third sending module 1101 may be configured to send a first packet to an access point AP, and the first packet carries an address of the GW and is used to instruct the AP configure a GRE tunnel to the GW, where a source address of the GRE tunnel is an address the AP, and a destination address of the GRE tunnel is the address of the GW. The fourth receiving module 1102 may be configured to receive a third packet sent by the AP by using the GRE tunnel, where the third packet carries the address of the AP, and the third packet is used to instruct the GW to configure a GRE tunnel to the AP.

Optionally, the third sending module 1101 is specifically configured to receive a Radius access response returned by an authentication server, and send the Radius access response that carries the address of the GW to the AP directly or by using an access controller AC.

Optionally, the Radius access response includes at least a GW address configuration attribute, and the GW address configuration attribute includes a type field, a length field, and an attribute value field, where a value of the type field is used to identify the attribute as the GW address configuration attribute, and a value of the attribute value field is the address of the GW.

Optionally, the third packet is formed by performing GRE tunnel encapsulation for a second packet after the AP receives the second packet sent by user equipment.

An apparatus in this embodiment may be used to perform the technical solution in the method embodiment shown in FIG. 7. For a specific function, refer to the foregoing method embodiment. Details are not described herein again.

Embodiment 12

Figure 12:
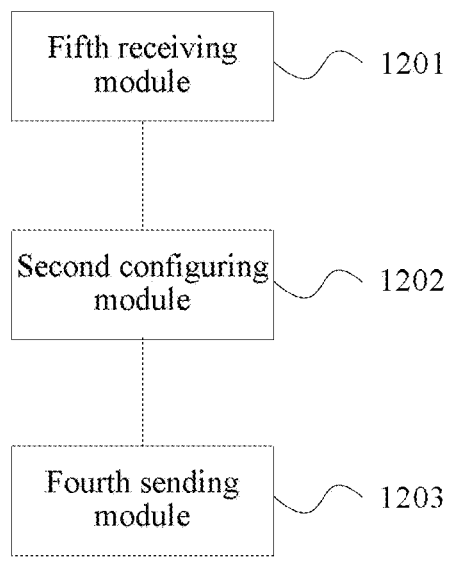
FIG. 12 is a schematic structural diagram of a gateway according to Embodiment 12 of the present application.

FIG. 12 is a schematic structural diagram of a gateway according to Embodiment 12 of the present application. As shown in FIG. 12, the gateway may include: a fifth receiving module 1201, a second configuring module 1202, and a fourth sending module 1203. The fifth receiving module 1201 may be configured to receive a fourth packet sent by an access point AP, and the fourth packet carries an address of the AP. The second configuring module 1202 may be configured to configure a GRE tunnel to the AP, where a source address of the GRE tunnel is an address of a GW, and a destination address of the GRE tunnel is the address of the AP. The fourth sending module 1203 may be configured to send a fifth packet to the AP by using the GRE tunnel, where the fifth packet carries the address of the GW, and the fifth packet is used to instruct the AP to configure a GRE tunnel to the GW.

An apparatus in this embodiment may be used to perform the technical solution in the method embodiment shown in FIG. 8. For a specific function, refer to the foregoing method embodiment. Details are not described herein again.

Embodiment 13

Figure 13:
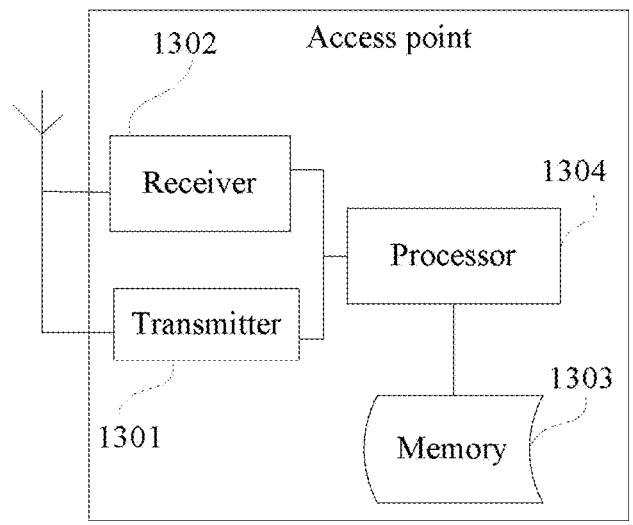
FIG. 13 is a schematic structural diagram of an access point according to Embodiment 13 of the present application.

FIG. 13 is a schematic structural diagram of an access point according to Embodiment 13 of the present application. As shown in FIG. 13, the access point may include: a transmitter 1301, a receiver 1302, a memory 1303, and a processor 1304 that is separately connected to the transmitter 1301, the receiver 1302, and the memory 1303. The memory 1303 stores a group of program code, and the processor 1304 is configured to invoke the program code stored in the memory 1303, which may perform the technical solution in the method embodiments shown in FIG. 1 to FIG. 6. For a specific function, refer to the foregoing method embodiments. Details are not described herein again.

Embodiment 14

Figure 14:
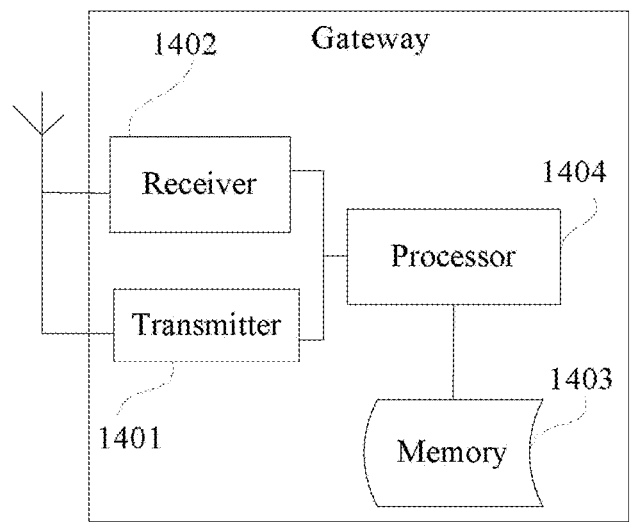
FIG. 14 is a schematic structural diagram of a gateway according to Embodiment 14 of the present application.

FIG. 14 is a schematic structural diagram of a gateway according to Embodiment 14 of the present application. As shown in FIG. 14, the access point may include: a transmitter 1401, a receiver 1402, a memory 1403, and a processor 1404 that is separately connected to the transmitter 1401, the receiver 1402, and memory 1403. The memory 1403 stores a group of program code, and the processor 1404 is configured to invoke the program code stored in the memory 1403, which may perform the technical solutions in the method embodiments shown in FIG. 7 and FIG. 8. For a specific function, refer to the foregoing method embodiments. Details are not described herein again.

A person of ordinary skill in the art may understand that all or a part of the method embodiments may be implemented by a program instructing relevant hardware. The foregoing program may be stored in a computer readable storage medium. When the program runs, the method embodiments are performed. The foregoing storage medium includes any medium that may store program code, such as a ROM, a RAM, a magnetic disk, or an optical disc.

Finally, it should be noted that the foregoing embodiments are merely intended for describing the technical solutions of the present application, other than limiting the present application. Although the present application is described in detail with reference to the foregoing embodiments, persons of ordinary skill in the art should understand that they may still make modifications to the technical solutions described in the foregoing embodiments, or make equivalent substitutions to some or all the technical features thereof, without departing from the spirit and scope of the technical solutions of the embodiments of the present application.

What is claimed is:

1. A method for implementing a generic routing encapsulation (GRE) tunnel by an access point (AP), comprising:
    establishing, by the AP, a Control And Provisioning of Wireless Access Points (CAPWAP) tunnel with an access controller (AC);
    receiving, by the AP, addresses of at least two gateways, wherein the gateways are devices other than the AC;
    establishing, by the AP, at least two GRE tunnels coupled to the gateways respectively according to the addresses of the at least two gateways;
    selecting, by the AP, one of the at least two GRE tunnels to transmit data;
    transmitting, by the AP, data over the selected GRE tunnel(s) to the corresponding GW.

2. The method according to claim 1, wherein each of the GRE tunnels directly coupled the AP and the corresponding GW.

3. The method according to claim 1, wherein the addresses of the at least two gateways are received from the AC.

4. The method according to claim 1, wherein a GRE tunnel in the at least two GRE tunnels is an alternative tunnel of the selected GRE tunnel.

5. The method according to claim 1, wherein the at least two gateways are load balancing gateways.

6. An access point (AP), comprising:
    a processor; and
    a computer readable medium which contains computer-executable instructions that, when executed by the processor, causes the AP to perform the steps of:
    establishing, by the AP, a Control And Provisioning of Wireless Access Points (CAPWAP) tunnel with an access controller (AC);
    receiving, by the AP, addresses of at least two gateways, wherein the gateways are devices other than the AC;
    establishing, by the AP, at least two generic routing encapsulation (GRE) tunnels coupled to the gateways respectively according to the addresses of the at least two gateways;
    selecting, by the AP, one of the at least two GRE tunnels to transmit data;
    transmitting, by the AP, data over the selected GRE tunnel(s) to the corresponding GW.

7. The access point according to claim 6, wherein each of the GRE tunnels directly coupled the AP and the corresponding GW.

8. The access point according to claim 6, wherein the addresses of the at least two gateways are received from the AC.

9. The access point according to claim 6, wherein a GRE tunnel in the at least two GRE tunnels is an alternative tunnel of the selected GRE tunnel.

10. The access point according to claim 6, wherein the at least two gateways are load balancing gateways.

11. A network system, comprising an access point (AP) and an access controller (AC), wherein a Control And Provisioning of Wireless Access Points (CAPWAP) tunnel coupled with the AP and the AC, and wherein
    the AP is configured to:
    receive addresses of at least two gateways, wherein the gateways are devices other than the AC;
    establish at least two generic routing encapsulation (GRE) tunnels coupled to the gateways respectively according to the addresses of the at least two gateways;
    select one of the at least two GRE tunnels to transmit data;
    transmit data over the selected GRE tunnel(s) to the corresponding GW.

12. The network system according to claim 11, wherein the network system further comprises one or more gateways of the at least two gateways.

13. The network system according to claim 11, wherein each of the GRE tunnels directly coupled the AP and the corresponding GW.

14. The network system according to claim 11, wherein the addresses of the at least two gateways are received from the AC.

15. The network system according to claim 11, wherein a GRE tunnel in the at least two GRE tunnels is an alternative tunnel of the selected GRE tunnel.

16. The network system according to claim 11, wherein the at least two gateways are load balancing gateways.

* * * * *